(12) United States Patent
Li et al.

(10) Patent No.: US 10,796,201 B2
(45) Date of Patent: Oct. 6, 2020

(54) FUSING PREDICTIONS FOR END-TO-END PANOPTIC SEGMENTATION

(71) Applicant: TOYOTA RESEARCH INSTITUTE, INC., Los Altos, CA (US)

(72) Inventors: Jie Li, Mountain View, CA (US); Arjun Bhargava, San Francisco, CA (US); Allan Ricardo Raventos Knohr, San Francisco, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 120 days.

(21) Appl. No.: 16/125,529

(22) Filed: Sep. 7, 2018

(65) Prior Publication Data

US 2020/0082219 A1 Mar. 12, 2020

(51) Int. Cl.
*G06K 9/62* (2006.01)
*G06K 9/00* (2006.01)
*G05D 1/02* (2020.01)
*G06K 9/72* (2006.01)

(52) U.S. Cl.
CPC ......... *G06K 9/6257* (2013.01); *G05D 1/0246* (2013.01); *G06K 9/00791* (2013.01); *G06K 9/726* (2013.01); *G05D 2201/0213* (2013.01)

(58) Field of Classification Search
CPC .. G06K 9/6257; G06K 9/00791; G06K 9/726; G05D 1/0246; G05D 2201/0213
See application file for complete search history.

(56) References Cited

U.S. PATENT DOCUMENTS

| 9,542,626 | B2 | 1/2017 | Martinson et al. |
| 9,916,522 | B2 | 3/2018 | Ros Sanchez et al. |
| 10,019,657 | B2 | 7/2018 | Lin et al. |
| 2018/0136656 | A1* | 5/2018 | Rasmusson, Jr. .. G01C 21/3638 |

OTHER PUBLICATIONS

Evolution of Image Segmentation using Deep Convolutional Neural Network (Year: 2020).*
Kirillov et al, "Panoptic Segmentation" arXiv preprint arXiv:1801.00868v2, Apr. 14, 2018.
Uhrig et al, "Pixel-Level Encoding and Depth Layering for Instance-Level Semantic Labeling", arXiv, GCPR 2016, LNCS 9796, pp. 14-25, Jul. 14, 2016.
Saleh et al, "Effective Use of Synthetic Data for Urban Scene Semantic Segmentation", arXiv preprint arXiv:1807.06132v1, Jul. 16, 2018.
Kendal et al, "Multi-task learning using uncertainty to weigh losses for scene geometry and semantics", arXiv prepring arXiv:1705.07115v3, Apr. 24, 2018.

(Continued)

*Primary Examiner* — Nizar N Sivji
(74) *Attorney, Agent, or Firm* — Seyfarth Shaw LLP

(57) ABSTRACT

A method for controlling a vehicle based on a panoptic map includes receiving an input from at least one sensor of the vehicle. The method also includes generating an instance map and a semantic map from the input. The method further includes generating the panoptic map from the instance map and the semantic map based on a binary mask. The method still further includes controlling the vehicle based on the panoptic map.

15 Claims, 6 Drawing Sheets

(56) References Cited

OTHER PUBLICATIONS

Neven et al, "Fast scene understanding for autonomous driving", arXiv prepring arXiv:1708.02550v1, Aug. 8, 2017.
Li et al, "Weakly-and Semi-Supervised Panoptic Segmentation", arXic preprint arXiv: 1808.03575v1, Aug. 10, 2018.
Casear et al, "Restoring the balance between stuff and things in scene understanding", 2018.
Neuhold et al, "The mapillary vistas dataset for semantic understanding of street scenes", CVPR, 2017.

* cited by examiner

FUSING PREDICTIONS FOR END-TO-END PANOPTIC SEGMENTATION

BACKGROUND

Field

Certain aspects of the present disclosure generally relate to panoptic segmentation and, more particularly, to a system and method for training a neural network to fuse predictions for end-to-end panoptic segmentation.

Background

Panoptic segmentation is a combination and extension of two conventional computer vision tasks: semantic segmentation and instance segmentation. Semantic segmentation accounts for semantic information of the scene and ignores the instance relationship between pixels with the same semantic label. For example, two different cars may receive the same label (e.g., car) in a semantic segmentation map. Instance segmentation is directed to detecting and recognizing countable objects, such as cars, while ignoring other uncountable concepts, such as sky, ground, etc. Panoptic segmentation is the joint task of predicting both semantic and instance segmentation information together per pixel. The desired output includes the semantic label and optionally an instance identifier, where the instance identifier is for countable objects.

Various approaches are used to combine the information. In some conventional panoptic segmentation networks, the instance information is overlaid on the semantic information. In other conventional panoptic segmentation networks, handcrafted post-processing heuristics are used to combine the information. In yet another approach, some conventional panoptic segmentation networks predict a semantic segmentation map and predict an instance segmentation map from the semantic segmentation map. In this approach, the panoptic segmentation map may be based on the instance segmentation map.

The overlaying fusion method may reduce an accuracy of the segmentation map. Furthermore, handcrafted heuristic fusion methods increase a use of system resources, thus, these methods are not scalable to large number of classes. Therefore, there is a need to improve the fusion of information from a semantic segmentation map and an instance segmentation map to improve an accuracy of a panoptic map. Furthermore, it is desirable to reduce the use of system resources, such that a panoptic network can scale to an increased number of classes in comparison to the handcrafted heuristic fusion methods.

SUMMARY

In one aspect of the present disclosure, a method for controlling a vehicle based on a panoptic map is disclosed. The method includes receiving an input from at least one sensor of the vehicle. The method also includes generating an instance map and a semantic map from the input. The method further includes generating the panoptic map from the instance map and the semantic map based on a binary mask. The method still further includes controlling the vehicle based on the panoptic map.

Another aspect of the present disclosure is directed to an apparatus including means for receiving an input from at least one sensor of the vehicle. The apparatus also includes means for generating an instance map and a semantic map from the input. The apparatus further includes means for generating the panoptic map from the instance map and the semantic map based on a binary mask. The apparatus still further includes means for controlling the vehicle based on the panoptic map.

In another aspect of the present disclosure, a non-transitory computer-readable medium with non-transitory program code recorded thereon is disclosed. The program code is for controlling a vehicle based on a panoptic map. The program code is executed by a processor and includes program code to receive an input from at least one sensor of the vehicle. The program code also includes program code to generate an instance map and a semantic map from the input. The program code further includes program code to generate the panoptic map from the instance map and the semantic map based on a binary mask. The program code still further includes program code to control the vehicle based on the panoptic map.

Another aspect of the present disclosure is directed to an apparatus for controlling a vehicle based on a panoptic map. The apparatus having a memory and one or more processors coupled to the memory. The processor(s) is configured to receive an input from at least one sensor of the vehicle. The processor(s) is also configured to generate an instance map and a semantic map from the input. The processor(s) is further configured to generate the panoptic map from the instance map and the semantic map based on a binary mask. The processor(s) still further configured to control the vehicle based on the panoptic map.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
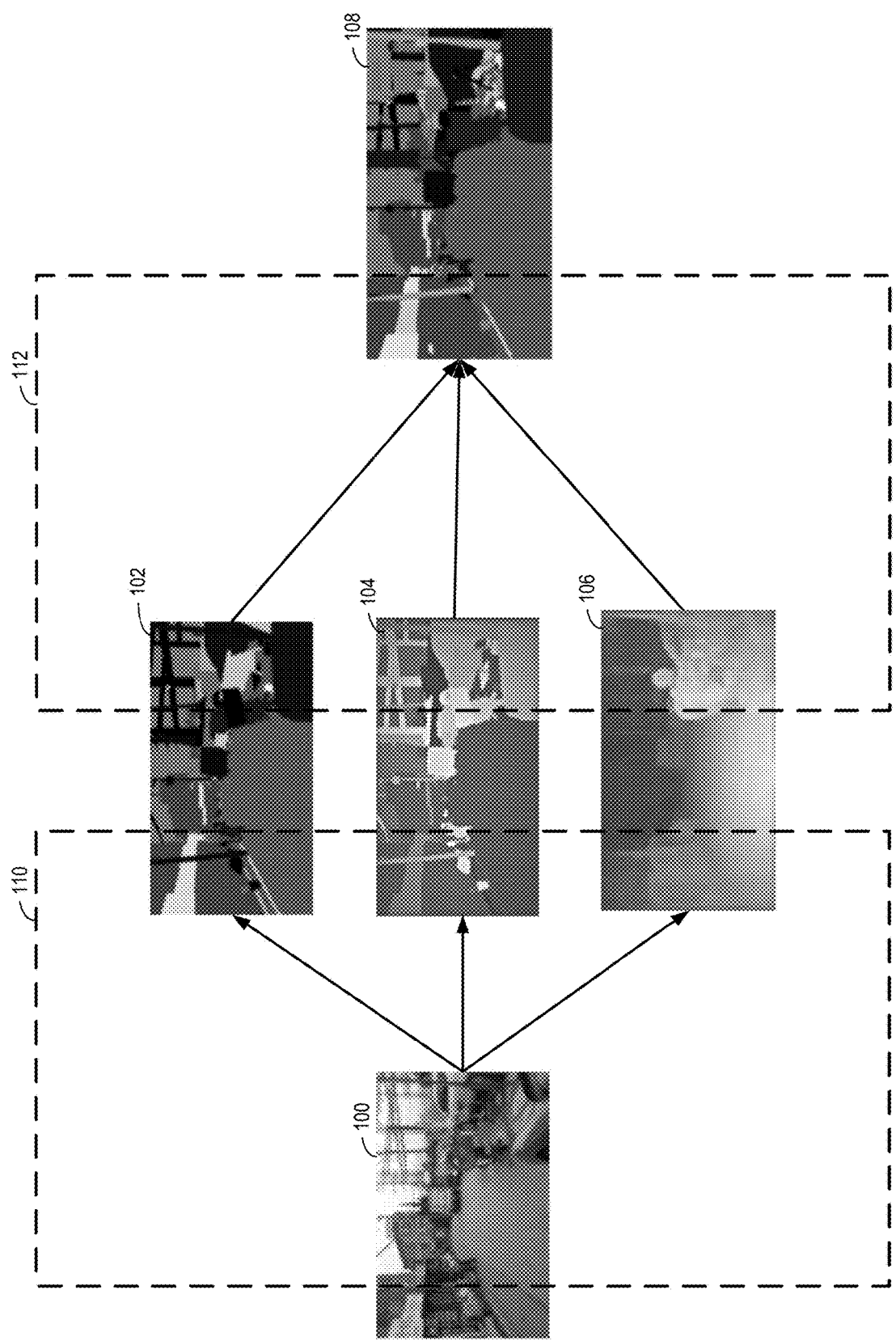
FIG. 1A illustrates an example of a panoptic segmentation network according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Autonomous agents (e.g., vehicles, robots, drones, etc.) and semi-autonomous agents may use scene understanding models, such as a trained artificial neural network, to identify objects and/or areas of interest in an image. In the present application, an agent refers to an autonomous or semi-autonomous agent. For example, the artificial neural network may be a convolutional neural network trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the agent. Object detection applications may analyze sensor image data to detect objects (e.g., pedestrians, cyclists, other cars, etc.) in the surrounding scene from an agent.

In some cases, an agent may use semantic segmentation. For example, semantic segmentation may be used to identify an area of road to assist the agent in localizing itself within the area, such that the agent may move safely within the area. In semantic segmentation, each pixel of an input, such as a red-green-blue image, is associated with a label (e.g., semantic label) to generate a semantic segmentation map. For example, in an image of a road, pixels may be associated with a predetermined number of labels, such as car, road, background, sign, or other objects found in a road image. For semantic segmentation, the instance relationships between pixels with the same label are ignored. For example, two different cars may receive the same label (e.g., car) in a semantic segmentation problem. As such, the cars are not distinguished from each other.

Instance segmentation identifies individual objects within a scene, regardless of whether the objects are of the same type. In instance segmentation the trained artificial neural network may identify countable objects, such as a number of cars, while ignoring background objects, such as sky, ground, road, etc. That is, in an image of a road, instance segmentation may identify other cars, pedestrians, bikes, and road signs, while ignoring the road, sky, and ground. In an instance segmentation map, each object may be identified by a bounding box or other type of identifier.

As discussed above, in semantic segmentation, individual instances of a same object are indistinguishable. In contrast, instance segmentation identifies individual instances of the same object and does not identify uncountable objects (e.g., background objects). To improve the operation of agents, panoptic segmentation networks combine information from a semantic segmentation map and information from an instance segmentation map to generate a panoptic segmentation map. The instance segmentation map, semantic segmentation map, and panoptic segmentation map may be referred to as the instance map, semantic map, and panoptic map, respectively.

In conventional panoptic segmentation networks, various approaches are used to obtain and combine (e.g., fuse) information from the instance map with information from the segmentation map. For example, in the conventional panoptic segmentation networks, multi-task joint networks perform semantic segmentation and instance segmentation with two separate decoders on top of a shared encoder. That is, a shared encoder may obtain features from an input and one decoder predicts the segmentation map and another decoder predicts the instance map.

Furthermore, in conventional panoptic segmentation networks, the combination of information is not learned. Rather, the outputs from the decoders are merged with manual heuristics. For example, in one conventional system, a non-maxima suppression rule overlays information from the instance map on top of the semantic map using different thresholds. One threshold may discard low-scoring segments and another threshold may discard non-overlapping segments. The thresholds may be manually adjusted.

Another conventional panoptic segmentation network predicts a semantic map with a semantic segmentation model and predicts the instance map from the semantic map using an external object detector. The panoptic map is then generated from the instance map and the semantic map. That is, fusion is performed at inference time using a recurrent neural network, which reduces the processing speed. In this system, the whole architecture is trained end-to-end, except for the object detector, using a recurrent neural network to generate approximate maximum a posteriori labeling from a conditional random field. This conventional panoptic segmentation network may provide greater flexibility to handle weak supervision, at the expense of accuracy and run-time efficiency.

In summary, some conventional panoptic segmentation networks use handcrafted post-processing heuristics that may not generalize across datasets. That is, these conventional panoptic segmentation networks may not be generic and cannot use different types of context information. Other conventional panoptic segmentation networks provide an end-to-end approach that reduces the problem to the instance sub-task. Accordingly, conventional panoptic segmentation networks may not generalize across datasets and may produce inaccurate results. Furthermore, the conventional panoptic segmentation networks increase the use of system resources, such as memory, processor load, power, etc.

Aspects of the present disclosure improve accuracy and reduce the use of system resources by learning a fusion mask (e.g., binary mask) from multiple streams. FIG. 1A illustrates an example of a semantic segmentation network according to aspects of the present disclosure. As shown in FIG. 1A, an image 100 is obtained from one or more sensors, such as an RGB camera. The image 100 may be processed by streams of a multi-stream segment 110 of the semantic segmentation network. The multi-stream segment 110 may include a semantic segmentation model, and instance segmentation model, and one or more context models.

Each model may correspond to a stream, where each stream is the output of an intermediate feature layer of the model. Each model may be a distinct artificial neural network. The stream of the semantic segmentation model output features used to generate a semantic map 102. Additionally, the stream of the instance segmentation model output features used to generate an instance map 104. In an optional configuration, one or more additional streams of the context models are used to generate the context data maps 106, such as a depth map.

As discussed, a semantic segmentation model may be used to generate the semantic map 102. The architecture of the semantic segmentation model may be described as an encoder network followed by a decoder network. The decoder semantically projects discriminative features learned by the encoder onto the pixel space to obtain a dense classification.

In contrast to conventional classifications, where the end result (e.g., the classification) of the artificial neural network is the main objective, semantic segmentation uses an encoder network for pixel-level discrimination as well as a decoding network for projecting the learned discriminative features onto the pixel space. Different approaches employ different decoding networks. Aspects of the present disclosure are not limited to a particular encoder/decoder network architecture for the semantic segmentation model An instance segmentation model may be used to generate the instance map 104. The architecture of an instance segmentation model may also be generally described as an encoder network followed by a decoder network. Aspects of the present disclosure are not limited to a particular encoder/decoder network architecture for the instance segmentation model.

Various context models may be used to generate the context map 106. For example, a depth-from-mono model may be used to generate a depth map. The depth-from-mono model estimates the depth of objects in an image obtained from a single sensor, such as an RGB camera. The depth data may also be obtained from multiple sensors. Additionally, or alternatively, a surface normal model may be used to obtain surface normal information and/or an optical flow model may be used to obtain optical flow information.

As is known to those of skill in the art, a normal may be a line or vector that is perpendicular to a given object. For example, in the two-dimensional case, the normal line to a curve at a given point is the line perpendicular to the tangent line to the curve at the point. In the three-dimensional case, a surface normal to a surface at a point P is a vector that is perpendicular to the tangent plane to that surface at the point P. Furthermore, optical flow data may provide a pattern of estimated motion of objects, surfaces, and edges in a visual scene based on a relative motion between an observer and a scene. Other context models may be used, for example, an edge model may be used to generate edge information of each object in an input. Aspects of the present disclosure are not limited to the depth-from-mono model, the surface normal model, edge model, and/or the optical flow model.

As shown in FIG. 1A, after generating the semantic map 102, instance map 104, and context map 106, a fusion segment 112 may fuse the information from the semantic map 102, instance map 104, and context map 106 to generate a panoptic map 108. The fusion segment 112 may be a network that is distinct from the multi-stream segment 110. In one configuration, the network of the fusion segment 112 is trained to learn a fusion mask (e.g., binary mask) for fusing the information from the semantic map 102 and the instance map 104. The information from the context map 106 may be used to improve the fusion.

According to aspects of the present disclosure, a panoptic segmentation network is trained to generate a panoptic map from an input, such as an RGB image. In one configuration, during training, a semantic segmentation dataset and model are defined to predict category confidence scores, per pixel, to provide a semantic segmentation stream (e.g., semantic map). The semantic segmentation dataset includes labels that provide semantic segmentation information. That is, each pixel in an input is labeled according to one of the labels in the semantic segmentation dataset.

Additionally, an instance segmentation dataset and model is defined to predict countable category instance IDs, per pixel, to provide an instance segmentation stream (e.g., instance map). The instance segmentation dataset includes labels that provide instance level information (e.g., instance IDs). For example, car A has a different label ID than Car B. One or more context models are also trained to extract one or more additional context streams (e.g., context map). For example, the context models may include a depth-from-mono model, a surface normal model, and/or an optical flow model.

A fusion model is used to output a panoptic prediction (e.g., panoptic map). The fusion model receives an output (e.g., features) from two or more of the instance model, segmentation model, and context models. The outputs may be received at multiple learnable fusion layers of the fusion model. The multiple learnable fusion layers of the fusion model may be 2D convolution layers on top of a channel-wise concatenation of the features.

A final layer of the fusion model predicts a binary mask that decides, for each pixel, whether the pixel is associated with a uniquely identifiable instance. The pixel is given an ID from the prediction of the instance model if it is associated with a uniquely identifiable instance. Alternatively, the pixel will be associated with the highest scoring non-instance category label prediction from the segmentation model. That is, the panoptic prediction may be generated from the outputs of the segmentation model, instance model, and fusion model.

Figure 1B:
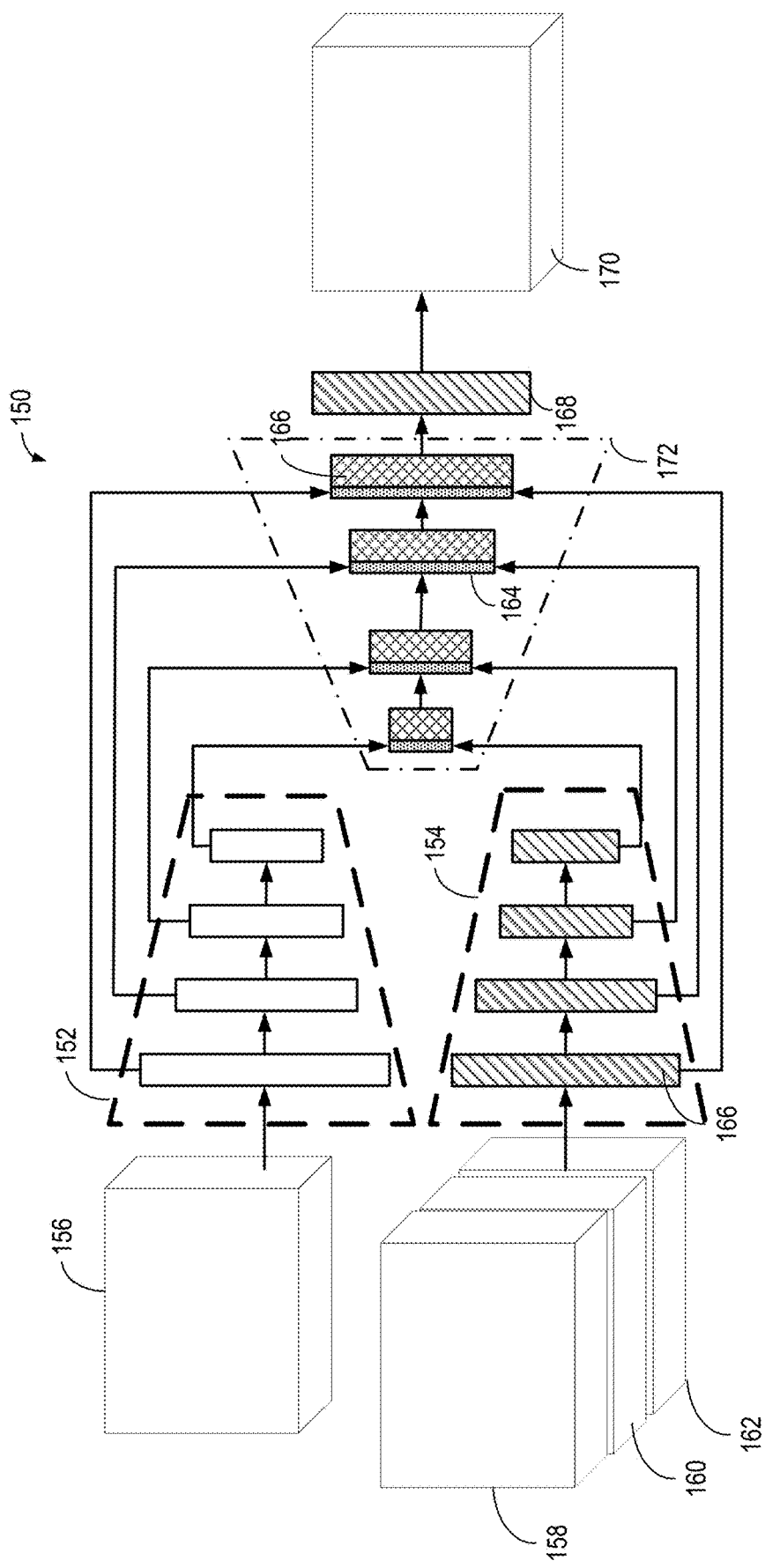
FIG. 1B illustrates an example of a fusion network according to aspects of the present disclosure.

FIG. 1B illustrates an example of a fusion model 150 according to aspects of the present disclosure. As shown in FIG. 1B, the fusion model 150 includes two encoders 152, 154 (e.g., 2D convolution layers). The first encoder 152 receives an input 156 generated by one or more sensors. For example, the input 156 may be an RGB image. The first encoder 152 may be a pre-trained deep convolutional neural network, such as ResNet-18.

The second encoder 154 receives a semantic segmentation stream 158, an instance segmentation stream 160, and a context stream 162. As discussed, each stream 154, 160, 162 is the output of an intermediate feature layer of a corresponding model. As such, the second encoder 154 receives features generated by a semantic model, an instance model, and a context model. The features are generated from the input 156 received at each model. Each layer 166 of the second encoder stream 154 may down sample the features.

As shown in FIG. 1B, each layer of the first encoder 152 and each layer 166 of the second encoder stream 156 outputs to a set of layers of a decoder 172 (e.g., deconvolution layers). Each layer in the decoder 172 includes a concatenation layer 164 and a deconvolution layer 166. The concatenation layer 164 concatenates the features from the input 156 and the features from the streams 154, 160, 162. The deconvolution layer 166 deconvolves the concatenated features. The final deconvolution layer 166 in the decoder 172 outputs features to residual blocks 168. A mask 170 is generated from the residual blocks 168.

The weights of the panoptic segmentation network may be adjusted end-to-end by minimizing a compound loss. The compound loss is the compounded error calculated as a sum of: an error of the segmentation model calculated from the semantic segmentation dataset; an error of an instance model calculated from the instance segmentation dataset, an error of the context models, and an error of the binary mask predicted by the fusion model. The error for the binary mask predication may be based on the instance segmentation labels or the semantic segmentation labels. That is, either labels for countable objects or labels for non-countable objects (e.g., background) may be used to calculate the error for the binary mask predication. In one configuration, the context models are pre-trained. In this configuration, the compound loss is not based on an error of the context models.

As discussed above, in some of the conventional panoptic segmentation networks use manual thresholding to combine instance segmentation results from an instance model with semantic segmentation results from a semantic model. The accuracy of the conventional panoptic segmentation networks may be sensitive to the threshold. In contrast to aspects of the present disclosure, the combination process of conventional panoptic segmentation networks does learn to combine the output of the instance model and semantic model.

In one configuration, the panoptic segmentation network learns the panoptic prediction end-to-end. Specifically, the panoptic segmentation network learns to combine the outputs of the semantic and instance models. The panoptic segmentation network may also combine also abstract features (e.g., activations from intermediate layers) as well as context features from one or more context models. The context features provide additional information to better distinguish countable objects from the background. For example, depth and/or normals may be implicit cues for object shape. The context features may also help distinguish densely packed objects that may be self-occluding each other (e.g., cars densely parked on the side of a street).

Figure 2:
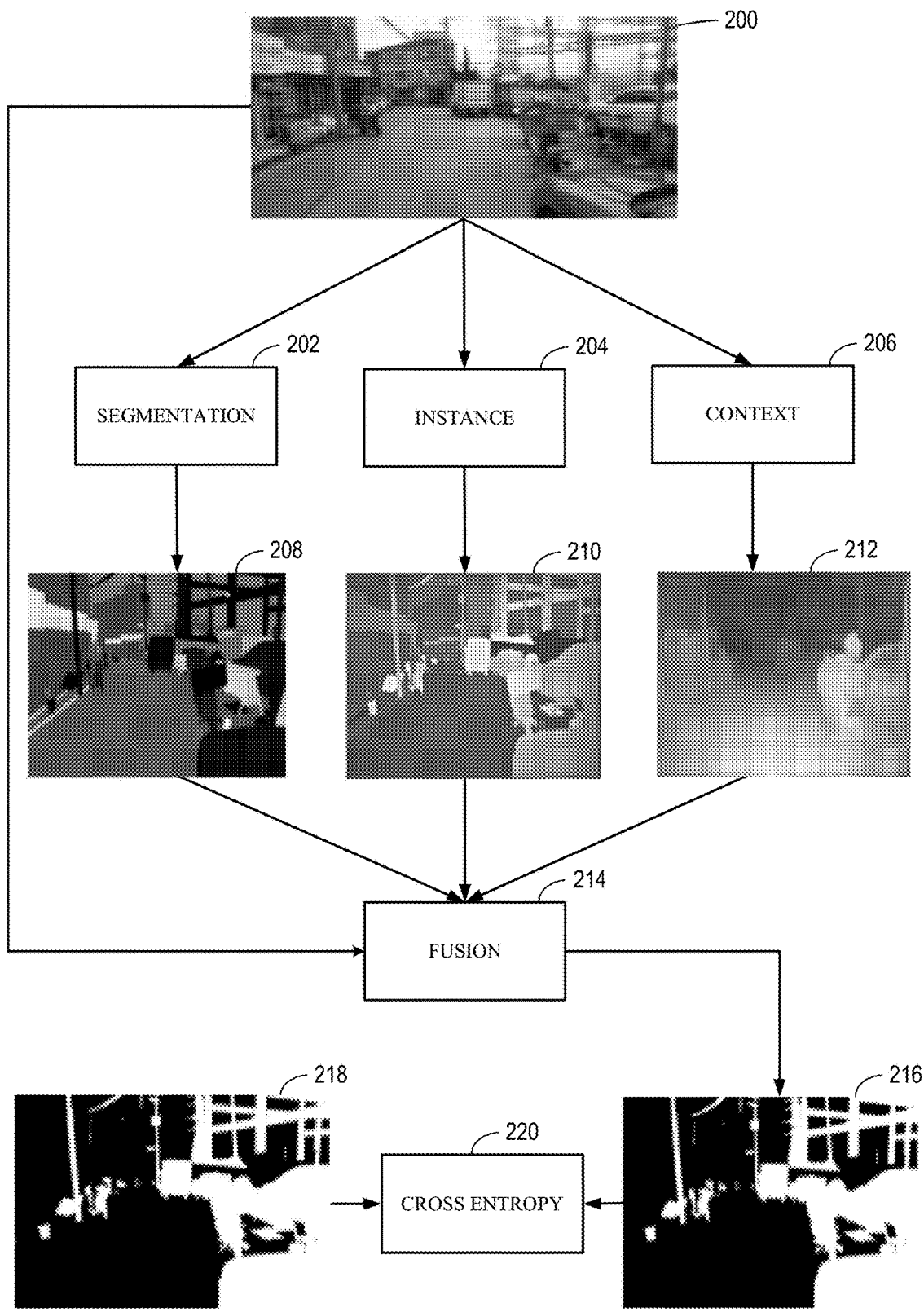
FIG. 2 illustrates an example of a panoptic segmentation network according to aspects of the present disclosure.

FIG. 2 illustrates an example of a panoptic segmentation network according to aspects of the present disclosure. As shown in FIG. 2, an image 200 is obtained from one or more sensors, such as an RGB camera. The image 200 may be processed by a multi-stream network. Each stream of the multi-stream network is a different model (e.g., artificial neural network).

As shown in FIG. 2, the image 200 is input to a segmentation model 202, an instance model 204, and a context model 206. Although not shown in FIG. 2, multiple context models 206 may be defined in the panoptic segmentation network. The segmentation model 202 extracts features from the image 200 to generate a segmentation map 208. The instance model 204 extracts features from the image 200 to generate an instance map 210. Finally, each context model 206 extracts features to generate a corresponding context map 212. The context models 206 may be a depth-from-mono model, a surface normal model, an optical flow model, an edge model, and/or another type of model that obtains contextual information from the image 100. The context models 206 may be pre-trained.

In one configuration, a fusion model 214 extracts information (e.g., features) from the output of each model 202, 204, 206. The fusion model 214 also extracts features from the image 200. Based on the extracted features, the fusion model 214 generates a mask 216. In one configuration, the mask 216 is a binary mask. Additionally, according to aspects of the present disclosure, feature adaptation and combination at the fusion model 214 occurs at different image scales. The different image scales capture a variety of receptive fields for different components in the scene. The mask 216 is used to determine whether a pixel belongs to a unique identifiable instance of an object. That is, the mask 216 defines how to merge the segmentation map 208 and the instance map 210 with a single function.

During training, the mask 216 is compared with a ground truth mask 218 to determine a loss. As the mask 216 may be a binary mask, the loss may be a cross entropy loss 220. As previously discussed, the loss may be a compound loss based on: an error of the semantic model, an error of the instance model, an error of the context model, and/or an error of the fusion model. The weights of the panoptic segmentation network may be adjusted end-to-end to minimize the compound loss. That is, the weights of one or more of the semantic model, instance model, context model, and/or fusion model may be adjusted to minimize the compound loss.

Aspects of the present disclosure support different training protocols. In one configuration, the system is trained end-to-end. In this configuration, the models 202, 204, 206, 214 are trained jointly. As such, the total loss is a compound loss including all of the losses of the models 202, 204, 206. In another configuration, the segmentation model 202, the instance model 204, and the context model 206 are independently trained. After training the segmentation model 202, the instance model 204, and the context model 206, the fusion model 214 is trained. The training protocol may be based on a computational capacity of a device use for training the panoptic segmentation network.

After training, the panoptic segmentation network may be deployed in an agent to generate a panoptic map. The panoptic segmentation network may be an artificial neural network that includes various sub-networks (e.g., models). The panoptic map is generated by applying the mask 216 to the instance map 210 and the semantic map 208. That is, based on the mask 216, the panoptic segmentation network determines whether a pixel in the image 200 is associated with an ID from the instance map 210 or a non-instance category label from the semantic map 208.

Each pixel in the image 100 is associated with a 2D coordinate (x, y). In one example, using the mask 216, the panoptic segmentation network determines whether a pixel $(x_i, y_i)$ belongs to a unique identifiable instance. In this example, in semantic map 208, pixel $(x_i, y_i)$ corresponds to the label for a street. Additionally, in the instance map 210, pixel $(x_i, y_i)$ does not correspond to a countable object. When the mask 216 is applied to the semantic map 208 and the instance map 210, the pixel $(x_i, y_i)$ of the instance map 210 is masked, such that the pixel $(x_i, y_i)$ of the panoptic map is given the label for the street.

As another example, in semantic map 208, pixel $(x_j, y_j)$ corresponds to the label for a car. Additionally, in the instance map 210, pixel $(x_j, y_j)$ corresponds to a countable object. Specifically, pixel $(x_j, y_j)$ corresponds to a specific car ID of the multiple cars found in the image 200. In this example, when the mask 216 is applied to the semantic map 208 and the instance map 210, the pixel $(x_j, y_j)$ of the semantic map 208 is masked, such that the pixel $(x_j, y_j)$ of the panoptic map is given the ID for the specific car.

Figure 3:
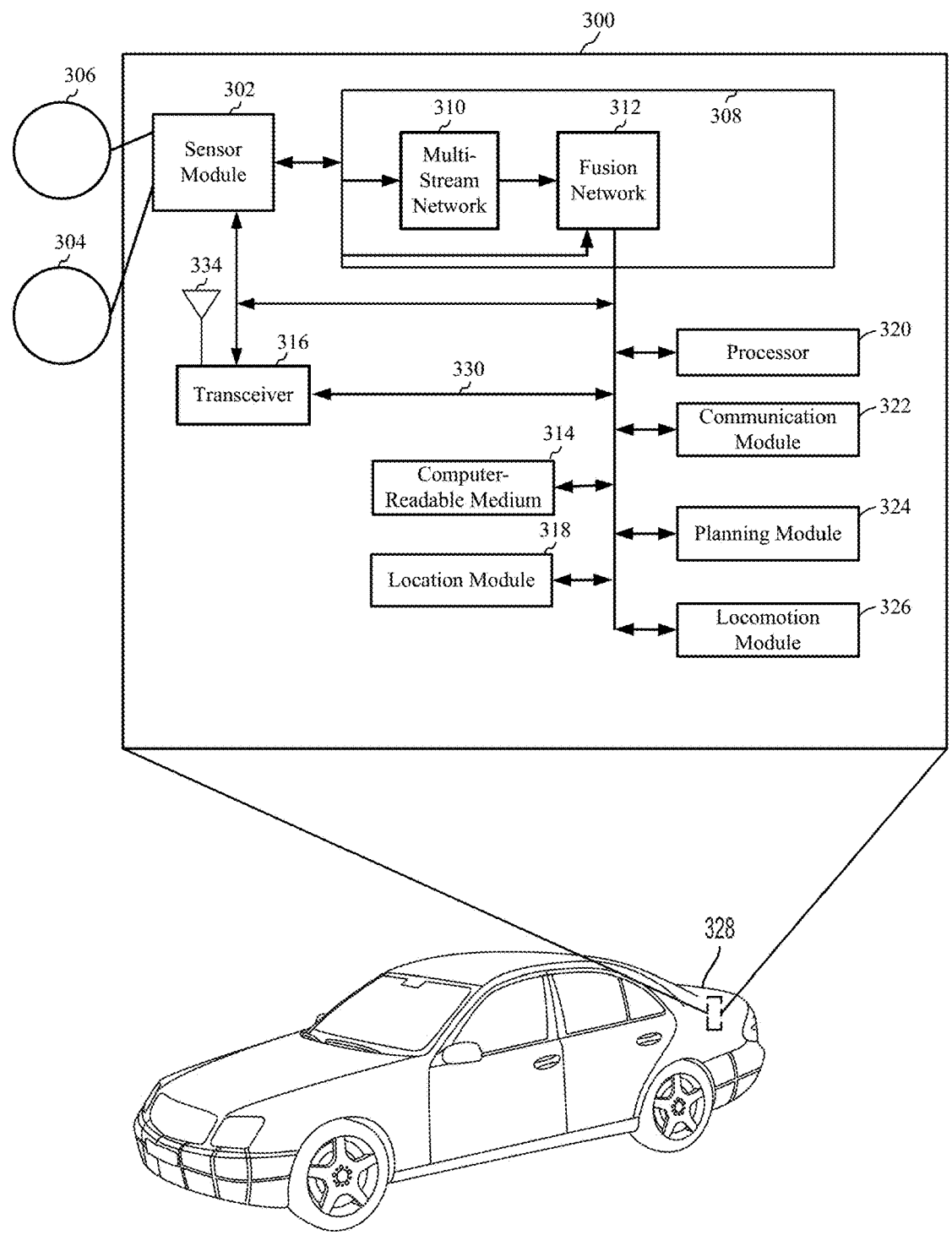
FIG. 3 is a diagram illustrating an example of a hardware implementation for a panoptic segmentation system according to aspects of the present disclosure.

FIG. 3 is a diagram illustrating an example of a hardware implementation for a panoptic segmentation system 300, according to aspects of the present disclosure. The panoptic segmentation system 300 may be a component of a vehicle, a robotic device, or other device. For example, as shown in FIG. 3, the panoptic segmentation system 300 is a component of a car 328. Aspects of the present disclosure are not limited to the panoptic segmentation system 300 being a component of the car 328, as other devices, such as a bus, boat, drone, or robot, are also contemplated for using the panoptic segmentation system 300. The car 328 may be autonomous or semi-autonomous.

The panoptic segmentation system 300 may be implemented with a bus architecture, represented generally by a bus 330. The bus 330 may include any number of interconnecting buses and bridges depending on the specific application of the panoptic segmentation system 300 and the overall design constraints. The bus 330 links together various circuits including one or more processors and/or hardware modules, represented by a processor 320, a communication module 322, a location module 318, a sensor module 302, a locomotion module 326, a planning module 324, and a computer-readable medium 314. The bus 330 may also link various other circuits such as timing sources, peripherals, voltage regulators, and power management circuits, which are well known in the art, and therefore, will not be described any further.

The panoptic segmentation system 300 includes a transceiver 316 coupled to the processor 320, the sensor module 302, a panoptic segmentation network 308, the communication module 322, the location module 318, the locomotion module 326, the planning module 324, and the computer-readable medium 314. The transceiver 316 is coupled to an antenna 334. The transceiver 316 communicates with various other devices over a transmission medium. For example, the transceiver 316 may receive commands via transmissions from a user or a remote device. As another example, the transceiver 316 may transmit driving statistics and information from the panoptic segmentation network 308 to a server (not shown).

The panoptic segmentation system 300 includes the processor 320 coupled to the computer-readable medium 314. The processor 320 performs processing, including the execution of software stored on the computer-readable medium 314 providing functionality according to the disclosure. The software, when executed by the processor 320, causes the panoptic segmentation system 300 to perform the various functions described for a particular device, such as the car 328, or any of the modules 302, 308, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306 and a second sensor 304. The first sensor 306 may be a vision sensor, such as a stereoscopic camera or a red-green-blue (RGB) camera, for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 304, 306. The measurements of the first sensor 306 and the second sensor 304 may be processed by one or more of the processor 320, the sensor module 302, the panoptic segmentation network 308, the communication module 322, the location module 318, the locomotion module 326, the planning module 324, in conjunction with the computer-readable medium 314 to implement the functionality described herein. In one configuration, the data captured by the first sensor 306 and the second sensor 304 may be transmitted to an external device via the transceiver 316. The first sensor 306 and the second sensor 304 may be coupled to the car 328 or may be in communication with the car 328.

The location module 318 may be used to determine a location of the car 328. For example, the location module 318 may use a global positioning system (GPS) to determine the location of the car 328. The communication module 322 may be used to facilitate communications via the transceiver 316. For example, the communication module 322 may be configured to provide communication capabilities via different wireless protocols, such as WiFi, long term evolution (LTE), 3G, etc. The communication module 322 may also be used to communicate with other components of the car 328 that are not modules of the panoptic segmentation system 300.

The locomotion module 326 may be used to facilitate locomotion of the car 328. As an example, the locomotion module 326 may control movement of the wheels. As another example, the locomotion module 326 may be in communication with a power source of the car 328, such as an engine or batteries. Of course, aspects of the present disclosure are not limited to providing locomotion via wheels and are contemplated for other types of components for providing locomotion, such as propellers, treads, fins, and/or jet engines.

The panoptic segmentation system 300 also includes the planning module 324 for planning a route or controlling the locomotion of the car 328, via the locomotion module 326, based on the analysis performed by the panoptic segmentation network 308. In one configuration, the planning module 324 overrides the user input when the user input is expected (e.g., predicted) to cause a collision. The modules may be software modules running in the processor 320, resident/stored in the computer-readable medium 314, one or more hardware modules coupled to the processor 320, or some combination thereof.

The panoptic segmentation network 308 may be in communication with the sensor module 302, the transceiver 316, the processor 320, the communication module 322, the location module 318, the locomotion module 326, the planning module 324, and the computer-readable medium 314. In one configuration, the panoptic segmentation network 308 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the panoptic segmentation network 308 may receive sensor data directly from the first sensor 306 and the second sensor 304.

As shown in FIG. 3, the panoptic segmentation network 308 may include a multi-stream network 310 and a fusion network 312. The multi-stream network 310 and the fusion network 312 may be components of a same or different artificial neural network, such as a deep convolutional neural network (CNN). The panoptic segmentation network 308 is not limited to a CNN. The multi-stream network 310 receives a data stream from the first sensor 306 and/or the second sensor 304. The data stream may include a 2D RGB image from the first sensor 306 and LIDAR data points from the second sensor 304. The data stream may include multiple frames, such as image frames.

The multi-stream network 310 may include a semantic segmentation model, an instance segmentation model, and one or more context models. Each model may be a distinct artificial neural network. Each model in the multi-stream network 310 may extract features from the data stream to generate a corresponding map, such as a semantic segmentation map, an instance segmentation map, and a context map.

The fusion network 312 may be another artificial neural network. The fusion network 312 extracts information (e.g., features) from the output of each model of the multi-stream network 310. The fusion network 312 also extracts features from the data stream. Based on the extracted features, the fusion network 312 generates a mask (e.g., binary mask). The mask 216 is used to determine whether a pixel is associated with a unique identifiable instance of an object. That is, the mask defines how to merge a segmentation map and an instance map with a single function to generate a panoptic map.

The panoptic map may be output from the panoptic segmentation network 308 to one or more of the sensor module 302, the transceiver 316, the processor 320, the communication module 322, the location module 318, the locomotion module 326, the planning module 324, and the computer-readable medium 314. For example, the panoptic map may be output to the processor 320 to determine a set of actions that may be performed based on the detected objects and their respective locations in relationship to the car 328. The actions may be retrieved from the computer-readable medium 314 or the planning module 324. Additionally, based on the classified features, one or more of the modules 302, 308, 314, 316, 318, 320, 322, 324, 326 may determine or update an action for the car 328. The planning module 324 may perform route planning, collision avoidance, or other planning functionality based on the classified features.

Figure 4:
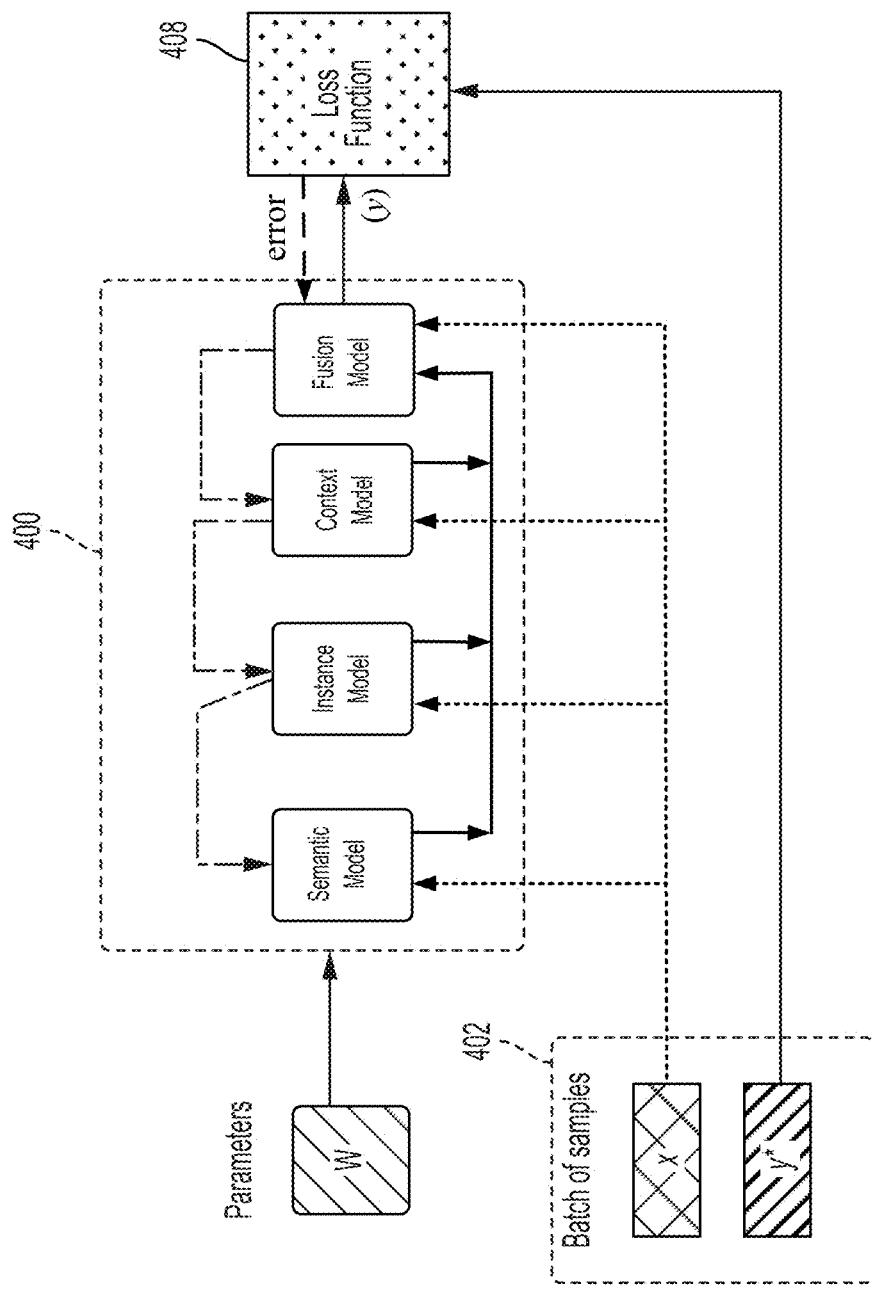
FIG. 4 illustrates a flow diagram for training a panoptic segmentation network according to aspects of the present disclosure.

FIG. 4 illustrates a flow diagram for training a panoptic segmentation network 400 according to an aspect of the present disclosure. In one configuration, input frames (x) are stored in a data source 402, such as a training server. The input frames (x) refer to frames that may be generated by a sensor, such as an RGB image. The data source 402 may also store ground truth masks (y*) corresponding to the input frames (x). The ground truth masks (y*) represent the true mask that is to be generated for each input frame (x).

The panoptic segmentation network 400 may be initialized with a set of parameters (w). The parameters may be used by the models of the panoptic segmentation network 400, such as the semantic model, the instance model, the context model, and/or the fusion model, to set weights and biases. Each model may include multiple layers. During training, each model of the panoptic segmentation network 400 extract features from the input frames (x). Each model may perform a different task based on the extracted features. The fusion model may also receive the output of each of the preceding models.

The fusion model generates a mask (y) based on the inputs received at the fusion model. The mask (y) is output to a loss function 408 that compares the mask (y) to the ground truth mask (y*). The error is the difference (e.g., loss) between the mask (y) and the ground truth mask (y*). The error is output from the loss function 408 to the panoptic segmentation network 400. The error is back-propagated through the panoptic segmentation network 400 to update the parameters. The training may be performed during an offline phase of the panoptic segmentation network 400.

Aspects of the present disclosure support different training protocols. In one configuration, the system is trained end-to-end. In this configuration, the models are trained jointly. As such, the total loss (e.g., error) is a compound loss including all of the losses of the models. In another configuration, the segmentation model, the instance model, and the context model are independently trained. After training the segmentation model, the instance model, and the context model, the fusion model is trained. The training protocol may be based on a computational capacity of a device use for training the panoptic segmentation network.

Figure 5:
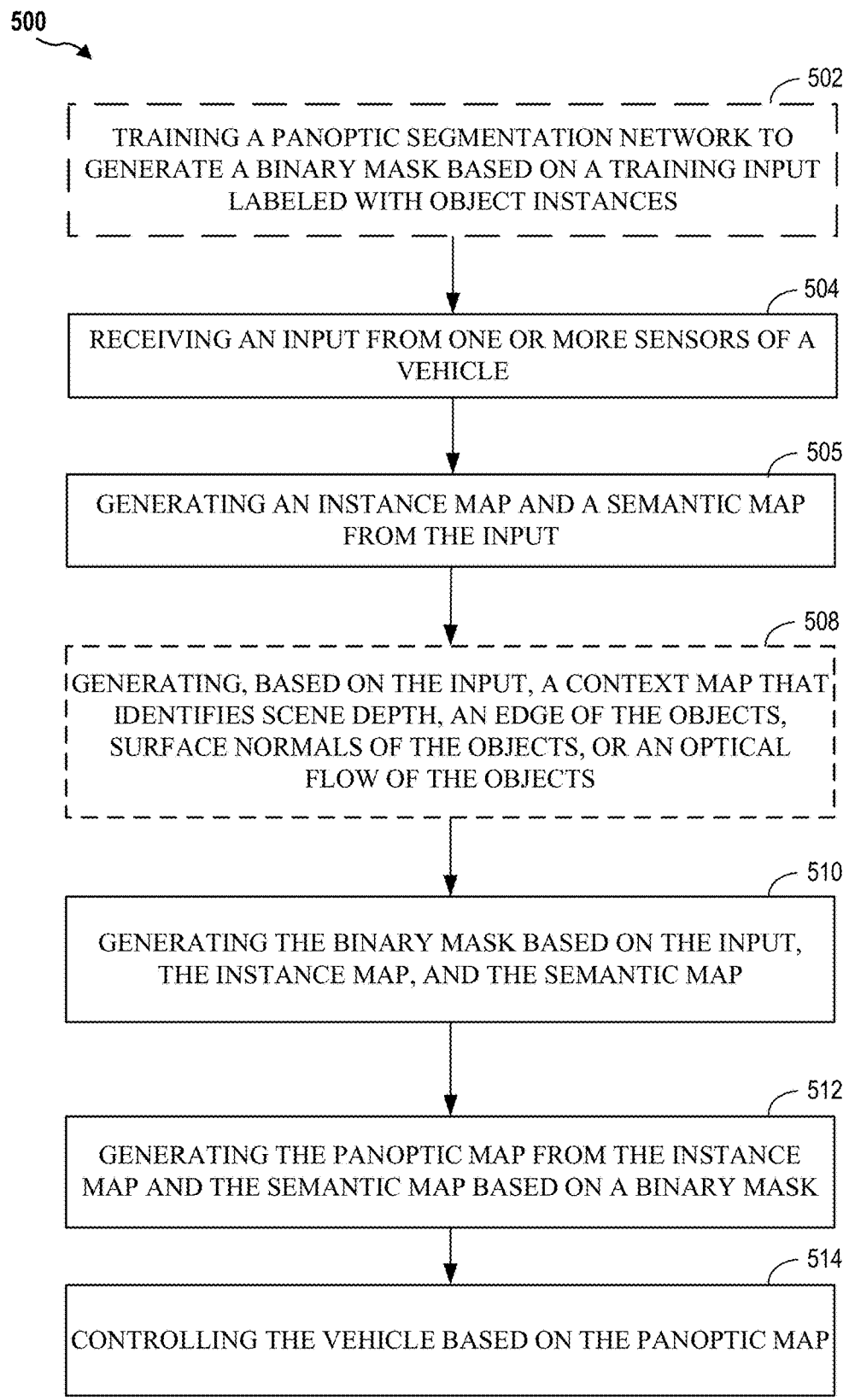
FIG. 5 illustrates a flow diagram for a method of operating a vehicle based on a panoptic segmentation map according to aspects of the present disclosure.

FIG. 5 illustrates a method 500 for panoptic segmentation according to an aspect of the present disclosure. As shown in FIG. 5, in an optional configuration, a panoptic segmentation network is trained to generate a binary mask based on a training input labeled with object instances. The panoptic segmentation network may be an artificial neural network as discussed herein. The panoptic segmentation network may include a semantic segmentation model, an instance segmentation model, one or more context models, and a fusion model. In one configuration, the semantic segmentation model, the instance segmentation model, the one or more context models, and the fusion model are trained end-to-end. A binary mask generated by the fusion model may be compared against a ground truth mask based on labeled object instances. Alternatively, the ground truth mask is based on labeled segments (e.g., non-countable objects).

After training, at block 502, the panoptic segmentation network receives an input from one or more sensors of a vehicle. For example, the input is an RGB image. The sensors may include a RGB camera, an RGB-D camera, LIDAR, RADAR, and the like. The one or more sensors may be coupled to, or in communication with, the vehicle. The vehicle may be an autonomous or semi-autonomous vehicle.

At block 504, the panoptic segmentation network generates an instance map and a semantic map from the input. The instance map identifies each instance of a countable object. For example, the instance map may provide a bounding box around each car in the input and provide a unique ID to each car. Non-countable objects may be static objects such as road, sky, ground, sidewalk, etc. The semantic map associates each pixel in the input with a label from a set of pre-defined labels. The semantic map does not identify unique instances of the same object. The instance map and semantic map may be generated by different artificial neural networks (e.g., models) within the panoptic segmentation network.

In an optional configuration, at block 508, the panoptic segmentation network generates, based on the input, a context map that identifies scene depth, an edge of the objects, surface normals of the objects, or an optical flow of the objects. The panoptic segmentation network may generate multiple context map, each map corresponding to different information within the input. The context maps are not limited to scene depth, an edge of the objects, surface normals of the objects, or an optical flow, as other types of context maps are contemplated.

At block 510, the panoptic segmentation network generates the binary mask based on the input, the instance map, and the semantic map. Specifically, the binary mask is generated based on features of the input and an output from intermediary layers of the semantic model and instance model. In addition, the binary mask may be generated based on features of an output from intermediary layers of the one or more context models.

The binary mask is used to determine whether a pixel is associated with a uniquely identifiable instance of an object in the input. For example, in a semantic map, pixel $(x_j, y_j)$ corresponds to the label for the road. Additionally, in an instance map, pixel $(x_j, y_j)$ corresponds to a countable object. Specifically, pixel $(x_j, y_j)$ corresponds to a specific pedestrian ID of the multiple pedestrians found in the input. In this example, when the binary mask is applied to the semantic map and the instance map, the pixel $(x_j, y_j)$ of the semantic map is masked, such that the pixel $(x_j, y_j)$ of the panoptic map is given the ID for the specific pedestrian.

At block 514, the panoptic segmentation network control the vehicle based on the panoptic map. For example, the panoptic map may provide detailed information regarding the vehicle's surroundings. The information may be used to generate a path that avoids a collision. The information may serve other purposes and is not limited to finding a path. For example, the information in the panoptic map may be used to find a parking spot between two cars.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a vehicle based on a panoptic map, comprising:
    receiving an input from at least one sensor of the vehicle;
    generating an instance map and a semantic map from the input;
    generating, based on the input, a context map identifying at least one of scene depth, an edge of the objects, surface normals of the objects, or an optical flow of the objects;
    generating a binary mask based on the input, the instance map, and the semantic map;
    generating the panoptic map by applying the binary mask to the instance map, the context map, and the semantic map; and
    controlling the vehicle based on the panoptic map.

2. The method of claim 1, in which:
    the instance map identifies each instance of a countable object; and
    the semantic map associates each pixel in the input with one of a plurality of labels.

3. The method of claim 1, further comprising generating the instance map and the semantic map with a different neural network.

4. The method of claim 1, further comprising generating the binary mask with an artificial neural network.

5. The method of claim 4, in which the binary mask is used to determine whether a pixel is associated with a uniquely identifiable instance of an object in the input.

6. The method of claim 4, further comprising training the artificial neural network to generate the binary mask based on a training input labeled with object instances.

7. An apparatus for controlling a vehicle based on a panoptic map, the apparatus comprising:
   a memory; and
   at least one processor coupled to the memory, the at least one processor configured:
      to receive an input from at least one sensor of the vehicle;
      to generate an instance map and a semantic map from the input;
      to generate, based on the input, a context map identifying at least one of scene depth, an edge of the objects, surface normals of the objects, or an optical flow of the objects;
      to generate a binary mask based on the input, the instance map, and the semantic map;
      to generate the panoptic map by applying the binary mask to the instance map, the context map, and the semantic map; and
      to control the vehicle based on the panoptic map.

8. The apparatus of claim 7, in which:
   the instance map identifies each instance of a countable object; and
   the semantic map associates each pixel in the input with one of a plurality of labels.

9. The apparatus of claim 7, in which the at least one processor is further configured to generate the instance map and the semantic map with a different neural network.

10. The apparatus of claim 7, in which the at least one processor is further configured to generate the binary mask with an artificial neural network.

11. The apparatus of claim 10, in which the binary mask is used to determine whether a pixel is associated with a uniquely identifiable instance of an object in the input.

12. The apparatus of claim 10, in which the at least one processor is further configured to train the artificial neural network to generate the binary mask based on a training input labeled with object instances.

13. A non-transitory computer-readable medium having program code recorded thereon for controlling a vehicle based on a panoptic map, the program code executed by a processor and comprising:
   program code to receive an input from at least one sensor of the vehicle;
   program code to generate an instance map and a semantic map from the input;
   program code to generate, based on the input, a context map identifying at least one of scene depth, an edge of the objects, surface normals of the objects, or an optical flow of the objects;
   program code to generate a binary mask based on the input, the instance map, and the semantic map;
   program code to generate the panoptic map by applying the binary mask to the instance map, the context map, and the semantic map; and
   program code to control the vehicle based on the panoptic map.

14. The non-transitory computer-readable medium of claim 13, in which:
   the instance map identifies each instance of a countable object; and
   the semantic map associates each pixel in the input with one of a plurality of labels.

15. The non-transitory computer-readable medium of claim 13, in which the program code further comprises program code to generate the binary mask with an artificial neural network.

* * * * *